United States Patent [19]

Johnson et al.

[11] 4,255,030
[45] Mar. 10, 1981

[54] CAMERA WITH PROPORTIONAL FILL FLASH QUENCH STROBE

[75] Inventors: Bruce K. Johnson, Andover; George D. Whiteside, Lexington, both of Mass.

[73] Assignee: Polaroid Corporation, Cambridge, Mass.

[21] Appl. No.: 74,993

[22] Filed: Sep. 13, 1979

[51] Int. Cl.³ ............................................. G03B 15/05
[52] U.S. Cl. ............................... 354/27; 354/33; 354/34; 354/137; 354/145; 354/29; 354/59
[58] Field of Search ............... 354/27, 29, 30, 32–35, 354/50, 51, 60 F, 48, 59, 137, 139, 145, 149, 230, 247, 127, 128

[56] References Cited

U.S. PATENT DOCUMENTS

| Re. 28,025 | 5/1974 | Murata et al. ......................... 354/33 |
| 3,620,143 | 11/1971 | Burgarella ............................ 354/49 |
| 3,683,769 | 8/1972 | Uchiyama et al. ..................... 354/33 |
| 3,737,721 | 6/1973 | Ogawa ............................. 354/33 X |
| 3,776,112 | 12/1973 | Wilwerding ........................... 354/33 |
| 3,896,458 | 7/1975 | Johnson et al. ....................... 354/30 |
| 3,942,183 | 3/1976 | Whiteside ............................ 354/29 |
| 4,005,444 | 1/1977 | Uchiyama et al. ..................... 354/27 |
| 4,023,187 | 5/1977 | Shenk ................................. 354/27 |
| 4,040,072 | 8/1977 | Johnson et al. ...................... 354/173 |
| 4,058,817 | 11/1977 | Johnson et al. ....................... 354/36 |
| 4,058,818 | 11/1977 | Johnson et al. ....................... 354/33 |
| 4,072,964 | 2/1978 | Pope et al. ........................... 354/33 |
| 4,074,288 | 2/1978 | Johnson et al. ....................... 354/33 |
| 4,104,653 | 8/1978 | Johnson et al. ....................... 354/27 |
| 4,150,891 | 4/1979 | Close ................................. 354/32 |
| 4,192,587 | 3/1980 | LaRocque ............................ 354/27 |

Primary Examiner—L. T. Hix
Assistant Examiner—William B. Perkey
Attorney, Agent, or Firm—Edward S. Roman

[57] ABSTRACT

A photographic exposure control system is provided for controlling the firing of an electronic flash of the quench type so as to automatically provide a proportional fill flash under conditions of substantial ambient scene light intensity. The photographic exposure control system may also control the firing of electronic quench flash under conditions of negligible ambient scene light intensity wherein the proportion of the exposure value attributable to the artificial scene light automatically increases in correspondence with the decrease in the ambient scene light intensity.

9 Claims, 7 Drawing Figures

CAMERA WITH PROPORTIONAL FILL FLASH QUENCH STROBE

BACKGROUND OF THE INVENTION

1. Field of the Invention

This invention relates generally to a photographic apparatus with a quench flash for providing a proportional fill-in flash, and more particularly, to a photographic system for controlling the firing of an electronic flash of the quench type under conditions of either substantial or negligible ambient scene light so that the flash contributes a predetermined proportion of the exposure under conditions of substantial ambient scene light intensity.

2. Description of the Prior Art

In the photographic art, exposure control systems embodying scanning shutter blade elements which operate to vary the exposure aperture areas with time during the exposure interval are well known as indicated by U.S. Pat. No. 3,942,183, entitled "Camera with Pivoting Blades", by G. Whiteside, issued Mar. 2, 1976, in common assignment herewith. Such scanning shutter blade mechanisms generally include a pair of counter-reciprocating shutter blade elements each having a primary aperture that transverses the optical axis of the camera during the exposure interval. The primary apertures are shaped so that upon overlying one another during countermovement of the blades, there is defined an effective exposure aperture value which increases to a maximum value in a determinate period of time.

Exposure control is provided by a pair of secondary photocell apertures is respective shutter blade elements which admit scene light to a photoresponsive element in correspondence with the scene light admitted to the focal plane during shutter blade movement through an exposure cycle. The output from the photoresponsive element is directed to an integration circuit which triggers upon reaching an integration level corresponding to a desired exposure value to terminate the exposure interval by returning the shutter blade elements back to their initial scene light blocking position.

Such exposure control systems may be utilized with a source of artificial illumination such as a flashbulb or electronic flash to provide artificial illumination not only during conditions of low ambient scene light intensity but also under conditions of high ambient scene light intensity wherein it becomes desirable to provide the artificial illumination to fill in the photographic subject against a brightly back lit scene as is more fully disclosed in U.S. Pat. No. 4,023,187, entitled "Exposure Control System with Fill Flash Race Condition", by E. Shenk, issued May 10, 1977, in common assignment herewith. The aforementioned artificial illumination control system operates under conditions of low ambient scene light intensity to fire the source of artificial illumination at a predetermined time period subsequent to the initiation of the exposure interval and under conditions of high ambient scene light intensity to fire the source of artificial illumination as a consequence of the time integration of the scene light intensity incident to the photoresponsive element reaching a predetermined value. Although the aforementioned artificial illumination control system performs in a highly satisfactory manner, it nevertheless fails to provide a select ratio or proportion between that part of the exposure which is directly attributable to the artificial scene illumination and the remaining part of the exposure which is directly attributable to ambient scene light illumination over a determinate range of camera-to-subject distances.

Such a proportional fill flash, however, has been provided in an automatic fashion in a manner as is described in U.S. Patent Application Ser. No. 960,062, entitled "Proportional Fill Flash", by A. LaRocque et al., filed Nov. 13, 1978, now U.S. Pat. No. 4,150,891 in common assignment herewith. A proportional fill flash is provided by the aforementioned system by utilizing a sonar ranging device to initially determine the camera-to-subject range and to thereafter utilize the ranging information to vary the time in which the flash is fired during the opening shutter blade movement so as to fire the flash at the appropriate aperture corresponding to the camera-to-subject range. Such a system, however, is complex and must embody some means for determining camera-to-subject range such as the aforementioned sonar range finder.

Therefore, it is a primary object of this invention to provide a photographic exposure control system for providing a proportional fill flash in a simple and economic manner utilizing an electronic flash of the quench type without a range finding device.

It is a further object of this invention to provide a simple and economic exposure control system for providing a proportional fill flash by firing and quenching an electronic flash of the quench type at the appropriate time during a photographic exposure cycle without determining the exact camera-to-subject distance.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

A photographic apparatus of the type having means for defining a film plane and an optical arrangement for transmitting light from a scene along an optical path to expose photosensitive film located in the film plane together with a system for controlling the firing of an electronic flash of the quench type under conditions of either substantial or negligible ambient scene light comprises the following. A blade mechanism is provided together with means for mounting the blade mechanism for movement between a blocking arrangement in which the blade mechanism is in light blocking relation with respect to the optical path to preclude scene light from being transmitted along the optical path to the film plane and an unblocking arrangement in which the blade mechanism is in light unblocking relation with respect to the optical path to allow the passage of scene light to the film plane. Actuatable drive means are provided for displacing the blade mechanism between its blocking and unblocking arrangements to define an exposure interval. Means are provided for detecting and integrating scene light in correspondence with the scene light admitted to the film plane by the blade mechanism during an exposure interval. Means are also provided to respond to the detection and integration of ambient scene light during the exposure interval to one signal level corresponding to a select proportion of a determined exposure value for providing a flash fire signal to fire the electronic flash. Means respond to the detection and integration of both ambient and artificial scene light to at least one other signal level greater than the one signal level for actuating the drive means to displace the blade mechanism from its unblocking arrangement to its blocking arrangement to terminate the exposure interval. Such means additionally respond to quench the artificial light from the electronic flash so that the artificial light from the flash contributes substantially to the remaining proportion of the determinate exposure value.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Figure 1:
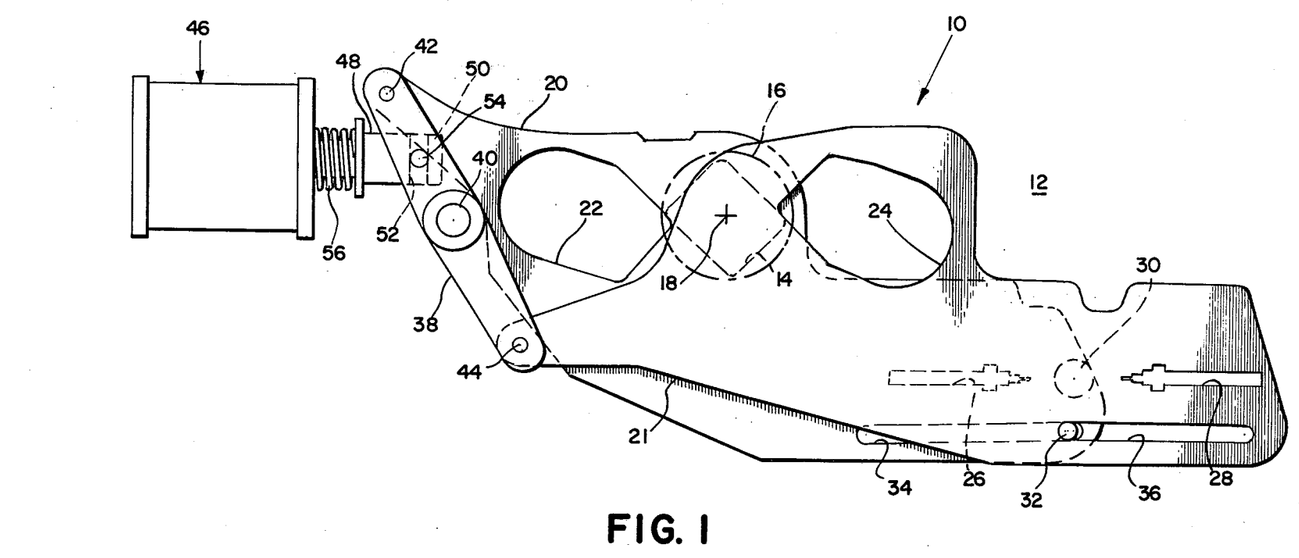
FIG. 1 is a front elevational view of the shutter blade mechanism of this invention.

Referring now to FIG. 1, there is shown generally at 10 a photographic exposure control apparatus disposed about a baseblock casting 12 which can be selectively machined to support the various components of a photographic exposure control mechanism. Centrally disposed within the baseblock casting 12, there is provided a light entry exposure opening 14 which defines the maximum available exposure aperture for the system. An objective or taking lens 16 is provided in overlying relation to the light entry opening 14 wherein the objective lens 16 may comprise a plurality of elements retained in spaced relation by a cylindrical lens mount or barrel which may be adapted in a well-known manner to provide translational movement of the elements of the lens 16 along a central optical axis 18 for focusing of image carrying rays through the light entry exposure opening 14. The image carrying rays are thereafter directed to a rearwardly positioned film plane (not shown) by way of a reflecting mirror (also not shown) all of which are stationed within a suitable light tight film exposure chamber (also not shown) in a manner as is more fully described in U.S. Pat. No. 4,040,072, entitled "Shutter Latch Arrangement Releasable Through Shutter Blade Actuation and Resettable Through Film Advancement", by B. Johnson et al., issued Aug. 2, 1977, in common assignment herewith and now incorporated by reference herein.

Intermediate the objective lens 16 and light entry exposure opening 14, there is provided a shutter blade mechanism comprising two overlapping shutter blade elements 20 and 21 of the so-called "scanning type" which will be subsequently described in greater detail herein. A pair of scene light admitting primary apertures 22 and 24 are provided respectively in the blade elements 20 and 21 to cooperatively define a progressive variation of effective aperture openings in accordance with simultaneous longitudinal and lateral displacement of one blade element with respect to the other blade element in a manner as is fully described in U.S. Pat. No. 3,942,183, entitled "Camera with Pivoting Blades", by George Whiteside, issued Mar. 2, 1977, in common assignment herewith and now incorporated by reference herein. The apertures 22 and 24 are selectively shaped so as to overlap the light entry exposure opening 14 thereby defining a gradually varying effective aperture size as a function of the position of the blade elements 20 and 21.

Each of the blades 20 and 21 may additionally be configured to have corresponding photocell sweep secondary apertures shown respectively at 26 and 28. Photocell sweep secondary apertures 26 and 28 may be configured to track in a predetermined corresponding relationship with respect to the scene light admitting primary apertures 22 and 24. As is readily apparent, the photocell sweep secondary apertures 26 and 28 move in the same manner as the primary apertures 22 and 24 to define a small secondary effective aperture for admitting the passage of scene light transmitted to a photoresponsive element 30 from the scene being photographed.

Projecting from the baseblock casting 12 at a location spaced laterally apart from the light entry exposure opening 14 is a pivot pin or stud 32 which pivotally and translatably engages the elongate slots 34 and 36 formed in respective shutter blade elements 20 and 21. Pin 32 may be integrally formed with the baseblock casting 12 and blade elements 20 and 21 may be retained in engaging relation with respect to the pin 32 by any suitable means such as peening over the outside end of pin 32.

The opposite ends of the blade elements 20 and 21 respectively include extended portions which pivotally connect to a walking beam 38. The walking beam 38, in turn, is disposed for rotation relative to the baseblock casting 12 by pivotal connection to a projecting pivot pin or stud 40 which may be integrally formed with the baseblock casting 12 at a location spaced laterally apart from the light entry exposure opening 14. The walking beam 38 may be pivotally retained with respect to the pin 40 by conventional means such as an E ring (not shown). In the preferred mode, the walking beam 38 is pivotally connected at its distal ends to the shutter blade elements 20 and 21 by respective pin members 42 and 44 which extend laterally outward from the walking beam 38. Pin members 42 and 44 are preferably circular in cross section and extend through respective circular openings in respective shutter blade elements 20 and 21. Thus, the shutter blade elements 20 and 21 provide a blade mechanism with the means for mounting the blade mechanism for movement being provided by the walking beam 38 together with the pivot pin 32.

Drive means are provided for displacing the blade mechanism and include a tractive electromagnetic device in the form of a solenoid 46 employed to displace the shutter blades 20 and 21 with respect to each other and the baseblock casting 12. The solenoid 46 includes an internally disposed cylindrical plunger unit 48 which retracts inwardly into the body of the solenoid upon energization of the solenoid winding. The solenoid plunger 48 includes an end cap 50 at the outside end thereof together with a vertical slot or groove 52 within the end cap 50 for loosely engaging a pin 54 extending outwardly from the walking beam 38. In this manner, the solenoid plunger 48 is affixed to the walking beam 38 so that longitudinal displacement of the plunger 48 will operate to rotate the walking beam about the pivot pin 40 so as to appropriately displace the shutter blades 20 and 21. The drive means may additionally include a helical compression spring 56 around the plunger 48 so as to continuously urge the end cap 50 outward of the solenoid 46, thereby also continuously urging the blade elements 20 and 21 into positions defining the largest effective primary aperture over the light entry exposure opening 14. As will be readily understood, in some shutter blade arrangements it may be preferable to utilize a tension spring in place of compression spring 56 in a manner as is shown in U.S. Pat. No. 3,942,183, supra. Thus, with the spring connection herein described, the exposure control system of this invention is biased to continuously urge the shutter blade elements 20 and 21 into an open scene light unblocking orientation.

Figure 2:
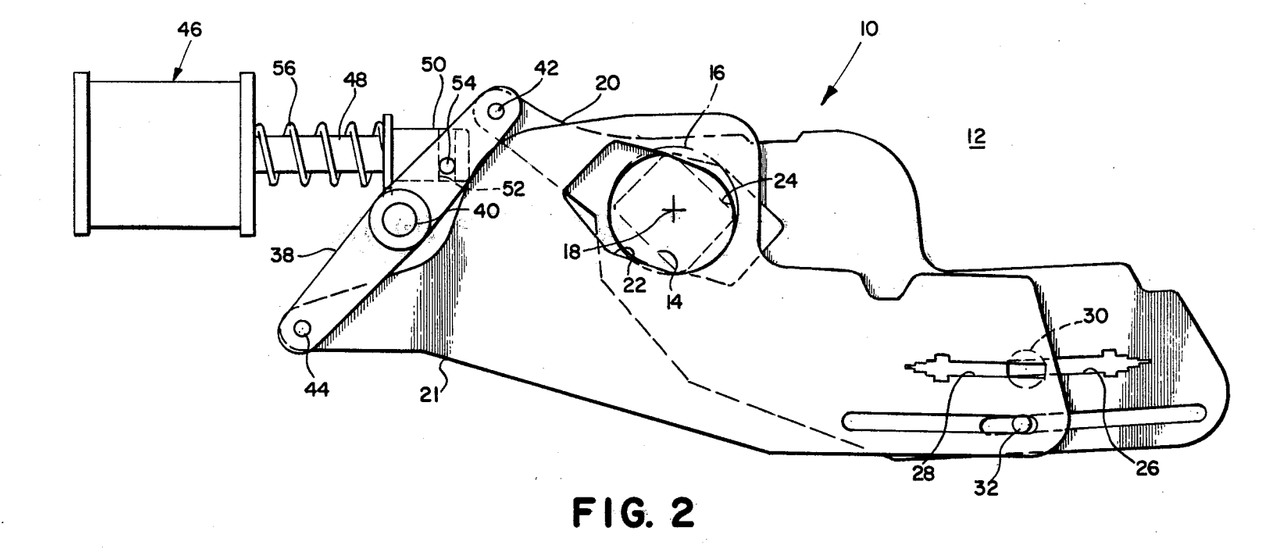
FIG. 2 is a front elevational view of the shutter blade mechanism of FIG. 1 in a different mode of operation.

In the present arrangement, the shutter blades 20 and 21 are drawn from their scene light unblocking open arrangement as shown in FIG. 2 to their scene light blocking closed arrangement as shown in FIG. 1 when the solenoid 46 is energized. Consequently, energization of solenoid 46 prevents the shutter blades 20 and 21 from moving towards their maximum effective primary aperture defining arrangement under the urging of compression spring 56. However, it should be readily understood that the exposure control system of this invention would be equally applicable to photographic systems where the blades 20 and 21 are spring biased in a normally closed position. However, since in the preferred embodiment the shutter blade elements 20 and 21 are spring biased to move toward their scene light unblocking arrangement, it would otherwise be necessary to maintain the solenoid in a state of continued energization in order to hold the shutter blade elements 20 and 21 in their scene light blocking arrangement as shown in FIG. 1. Such continued energization of the solenoid 46, however, would present an intolerable power drain on the camera battery, particularly if the solenoid 46 had to be continuously energized even when the camera apparatus were not in use. In order to avoid this continued energization of the solenoid 46, there is provided a latch mechanism (not shown) which operates normally to latch the shutter blade mechanism in its scene light blocking arrangement as shown in FIG. 1 and which automatically unlatches the shutter blade mechanism to permit the shutter blade elements 20 and 21 to be moved to their scene light unblocking arrangement as shown in FIG. 2 in order to commence a photographic exposure cycle and which further automatically responds at the termination of an exposure cycle to relatch the shutter blade elements 20 and 21 in their scene light blocking arrangement so as to permit the deenergization of the solenoid 46. The manner in which the aforementioned latch operates is more fully described in U.S. Pat. No. 4,040,072, supra.

Figure 3:
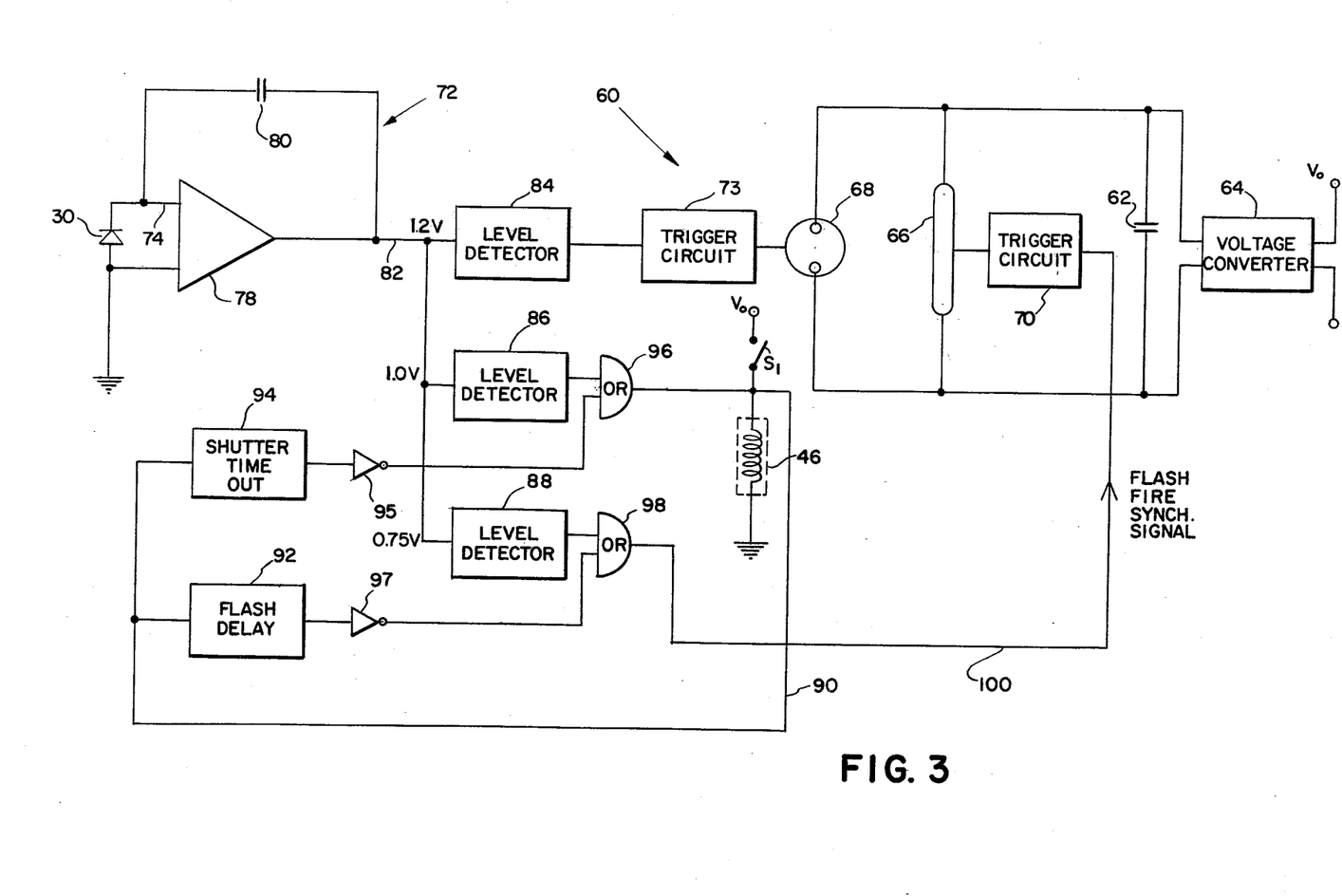
FIG. 3 is an electrical schematic view of the exposure control system of this invention.

Referring now to FIG. 3, there is shown at 60 a schematic wiring diagram for an electronic flash apparatus cooperatively associated with the photographic camera apparatus of this invention to contribute a predetermined proportion, i.e., fill flash, of the scene light admitted by the shutter blade mechanism to expose the film in a manner to be subsequently described. The electronic flash apparatus 60 comprises a main storage capacitor 62 which may be charged up to an operating voltage by any conventional voltage converter circuit as shown at 64. The voltage converter 64 operates in a conventional manner to convert a DC voltage, as may be derived from the camera battery (not shown) which can be in the order of six volts, to a suitable strobe operating voltage such as 350 volts. A flash tube 66 and a quench tube 68 for interrupting the flash discharge are connected in parallel relation with respect to the storage capacitor 62. The flash tube 66 can be ignited by a trigger circuit 70 of any conventional form which is set in operation by a flash fire signal to be derived in the following manner. A quench tube 68 may be ignited by another conventional trigger circuit 73 which is connected to respond to sudden change in the output signal level of a conventional level detector 84 such as a Schmitt trigger.

As shown generally at 72, there is provided a scene light detecting and integrating control circuit comprising the photoresponsive element 30 connected across the input terminals 74 and 76 of an operational amplifier 78 of the differential variety. When considered ideally, the amplifier 78 has an infinite gain and an infinite input impedance and a zero output impedance. The input circuitry of the amplifier 78, however, is structured such that the apparent input impedance for that "scene" by the photoresponsive element 30 is substantially zero, thereby functioning in a manner which permits the photoresponsive element 30 to operate in a current mode. Consequently, the current generated by the photoresponsive element 30 is limited substantially only to its own internal impedance. To accomplish this effect, a feedback capacitor 80 is connected between one input terminal 74 of the operational amplifier 78 and an output terminal 82 from the operational amplifier 78.

With the feedback arrangement described, any difference of potential supplied by the photoresponsive element 30 across input terminals 74 and 76 will operate to cause a current of opposite polarity to be produced through feedback capacitor 80. As a consequence, the feedback capacitor 80 provides a substantially instantaneous feedback signal of opposite polarity which serves to counteract any differential signal voltage impressed by the photoresponsive element 30 across the input terminals 74 and 76. Thus, although the amplifier 76 has a very high input impedance, the photoresponsive element 30, when connected in the aforementioned manner, experiences only a very low input impedance to the amplifier 78. Therefore, the current output of the photoresponsive element 30 is directed into the feedback circuit 78. In this manner, the photoresponsive element 30 is connected to operate in a constant current mode of operation under conditions of non-varying scene light intensity to provide a substantially linear output response at output terminal 82 as is more fully described in U.S. Pat. No. 3,620,143, entitled "Automatic Exposure Control System With Fast Linear Response", by J. Burgarella, issued Nov. 16, 1971, in common assignment herewith and now incorporated by reference herein in its entirety.

The output signal from the light integrator circuit 72 is directed to three level detector circuits 84, 86, 88 which all may be of a well-known design such as a Schmitt trigger. As previously discussed, the output from the level detector 84 controls the quench trigger circuit 73 of the electronic flash 60. The output signal from the level detector 86 is directed to an OR gate 96 which, in turn, provides an output signal to control the energization of the solenoid 46. The output signal from the level detector 88 is directed to an OR gate 98 which, in turn, provides an output signal along line 100 to control the flash fire trigger circuit 70. For purposes of illustration, level detector 86 is configured to trigger at 1.0 volt, which is a normalized value representative of a select or optimum film exposure value for a predetermined film speed. Level detector 84 is set to trigger at 1.2 volts, and level detector 88 is set to trigger at 0.75 volts for reasons which will become apparent from the following discussion. Again the 1.2 volt and 0.75 volt trigger levels represent normalized values.

A flash time delay circuit as shown generally at 92 receives an input signal by way of a line 90 upon the deenergization of the solenoid 46 to provide a time delayed output signal which is inverted by an inverter 97 and thereafter directed to the other input terminal of the OR gate 98. The time delay provided by the circuit 92 is preferably in the order of 65±4 msec. In like manner, a shutter time out circuit as shown generally at 94 receives an input signal upon the deenergization of the solenoid 46 to provide a time delayed output signal which is inverted by an inverter 95 and thereafter directed to the other input terminal of the OR gate 96. The time delay provided by the circuit 94 is preferably in the order of 100 milliseconds.

Assuming that the electronic flash 60 has been fully charged by turning on the voltage converter 64, a photographic exposure cycle may be commenced in the usual manner by actuating a photographic cycle initiation button (not shown) which operates, in turn, to energize the solenoid 46 and release the shutter blade latch mechanism (not shown) in the manner as is fully described in U.S. Pat. No. 4,040,062, supra. The photographic exposure cycle is subsequently commenced automatically upon the opening of the switch $S_1$ to deenergize the solenoid 46 and release the shutter blade elements 20 and 21 for movement from the scene light blocking arrangement of FIG. 1 to the scene light unblocking arrangement of FIG. 2. The shutter blade elements 20 and 21 are thus moved by the walking beam 38 and compression spring 56 in directions which operate to progressively enlarge the effective scene light admitting primary aperture defined by the overlapping apertures 22, 24 over the light entry exposure opening 14. Rotation of the walking beam 38 as previously discussed, effects a simultaneous linear and angular movement of the shutter blade elements 20 and 21 about the pivot pin 32 so that the photocell sweep secondary apertures 26 and 28 define a corresponding progressively enlarging effective photocell sweep aperture over the photoresponsive element 30.

Figure 4:
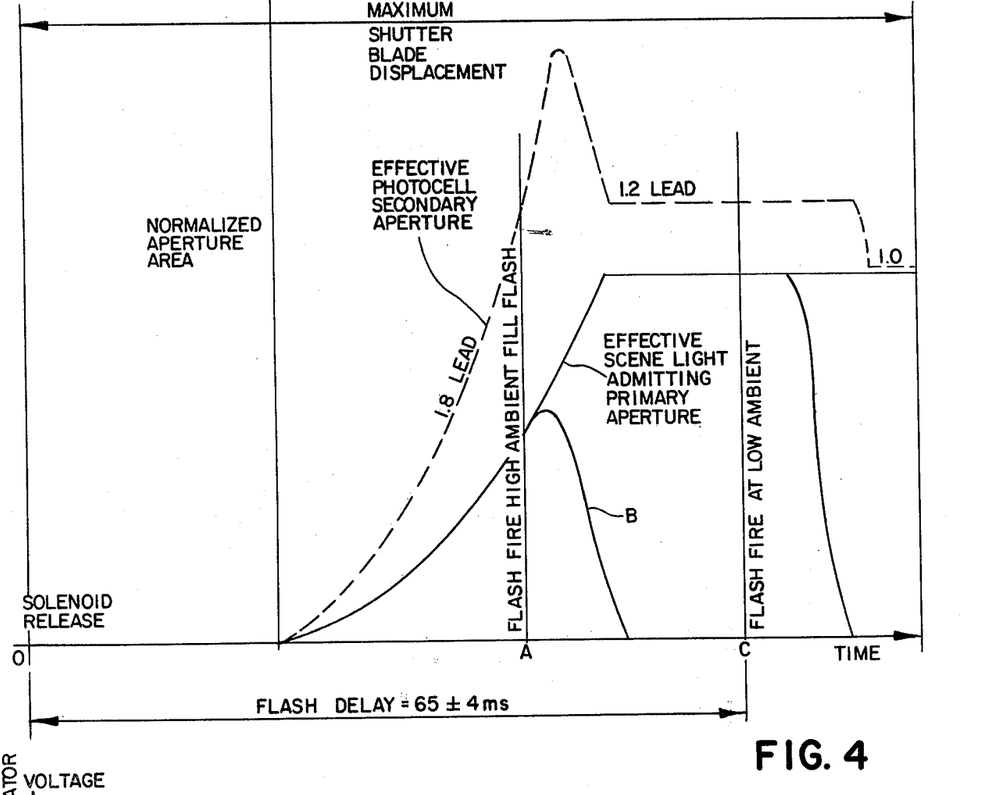
FIG. 4 is a graphical representation of the variation in aperture area versus time for the shutter blade mechanism of FIG. 1.

Referring now to FIG. 4, there is graphically shown the normalized areas for the range of effective scene light admitting primary apertures defined by the overlapping apertures 22 and 24 and the range of effective photocell sweep secondary apertures defined by the overlapping apertures 26, 28. As is readily apparent, the normalized area of the effective photocell sweep secondary aperture defined by the overlapping secondary apertures 26 and 28 tracks ahead of or leads the area of the effective scene light admitting primary aperture defined by the overlapping primary apertures 22 and 24. During that portion of the shutter blade displacement wherein the areas of both the effective scene light admitting primary and photocell sweep secondary apertures progressively enlarge, the lead factor is shown to remain substantially constant at 1.8. During the dwell portion of the shutter blade displacement, wherein the areas of the effective scene light admitting primary and photocell sweep secondary apertures remains substantially constant due to the masking effect of the light entry exposure opening 14, it can be seen that the lead factor initially changes to 1.2 for a predetermined time period after which the lead factor disappears entirely. The lead of the effective photocell sweep secondary aperture is provided to anticipate in a well-known manner for the additional scene light admitted to the film plane during the finite time required to drive the shutter blade elements 20 and 21 from the scene light unblocking arrangement of FIG. 2 back to the scene light blocking arrangement of FIG. 2, as is more fully described in U.S. Pat. No. 3,896,458, entitled "Automatic Exposure Control System", issued July 22, 1975, in common assignment herewith and now incorporated by reference herein. The photocell lead factor may be defined by the following formula:

$$\text{Lead Factor} = \frac{\dfrac{\text{area of effective photocell sweep secondary aperture}}{\text{area of effective photocell sweep secondary aperture when walking beam is at full open stroke (FIG. 2)}}}{\dfrac{\text{area of effective scene light admitting primary aperture}}{\text{area of effective scene light admitting primary aperture when walking beam is at full open stroke (FIG. 2)}}}$$

Figure 5:
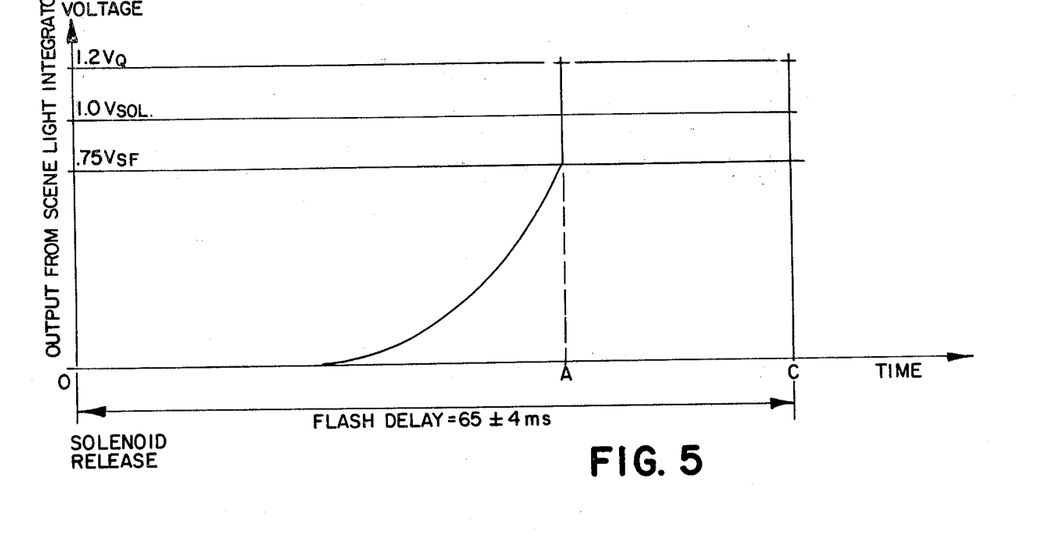
FIG. 5 is a graphical representation of the variation in scene light integration versus time for different exposure cycles.

Under conditions of high ambient scene light intensity, i.e., 100 cd/ft$^2$, the photoresponsive element 30 provides a time varying response corresponding to the intensity of scene light incident thereon. The feedback capacitor 80 operates in conjunction with the operational amplifier 78 and photoresponsive element 30 to provide an output signal as shown in FIG. 5 which is representative of the time integration of the scene light intensity incident to the photoresponsive element 30. When the scene light integration signal reaches 0.75 volts, the level detector 88 is triggered to provide an assertive (binary logic level 1) output signal to the OR gate 98, so as to switch the OR gate 98, and provide an assertive (binary logic level 1) output signal level to trigger the flash trigger circuit 70, thereby firing the flash tube 66 in a well-known manner at a time A as shown in the graphs of FIGS. 4 and 5.

If the photographic subject is within the effective range of the flash, there will be provided an immediate and substantial increase in the reflected scene light directed to the photoresponsive element 30. The photoresponsive element 30 and its associated light integrating circuit 72 will respond immediately to this increased artificial scene light to provide the required voltages to trigger the level detectors 84 and 86. The level detector 86 thus provides an assertive (binary logic level 1) output signal level to the OR gate 96 so as to switch the OR gate 96 and provide an assertive output signal sufficient to effect the reenergization of the solenoid 46. The plunger 48 is thereby retracted and operates to rotate the walking beam 38 in a counterclockwise direction back to the scene light blocking arrangement as shown in FIG. 1 in order to terminate the exposure interval. The variation in the effective scene light admitting primary aperture as defined by the overlapping apertures 22 and 24 during the closing movement of the shutter blade elements is shown graphically by the curve B in FIG. 4.

Since the rate of scene light integration becomes so steep subsequent to the firing of the flash 66 (see FIG. 5), the level detector 84 is triggered almost simultaneously with the level detector 86 and provides an assertive (binary logic level 1) output signal to trigger the quench trigger circuit 73 so as to fire the quench tube 68 and terminate the artificial light provided by the flash tube 66.

The proportion of the film exposure attributable to the artificial flash light may be computed by the following formula: $(V_q - V_{sf})/(PL)$. In the aforementioned formula, $V_q$ equals the voltage level at which the quench level detector 84 is triggered and $V_{sf}$ represents the voltage level at which the flash fire level detector 88 is triggered and PL represents the aforementioned photocell lead. Thus, under conditions where the photocell lead is 1.8 as shown graphically in FIG. 4 and the voltage trigger levels are, respectively, 0.75 volts and 1.2 volts for the level detectors 88 and 84, there can be seen to be provided an artificial flash light contribution to the selected film exposure value of 25%.

Under conditions of reduced ambient scene light intensity where the light integrator may reach the 0.75 output voltage level subsequent to the effective scene light admitting primary aperture reaching its maximum aperture defining position but prior to the expiration of the 65±4 millisecond flash delay time, it can be seen that the proportional contribution of the artificial flash illumination to the selected film exposure value will change as a result of the change in the photocell lead from 1.8 to 1.2. Under the aforementioned conditions, the artificial flash light contribution will be 37% of the selected film exposure value and the ambient scene light contribution will remain at 75% thereby providing an actual film exposure value of 112% of the selected film exposure value.

Figure 6:
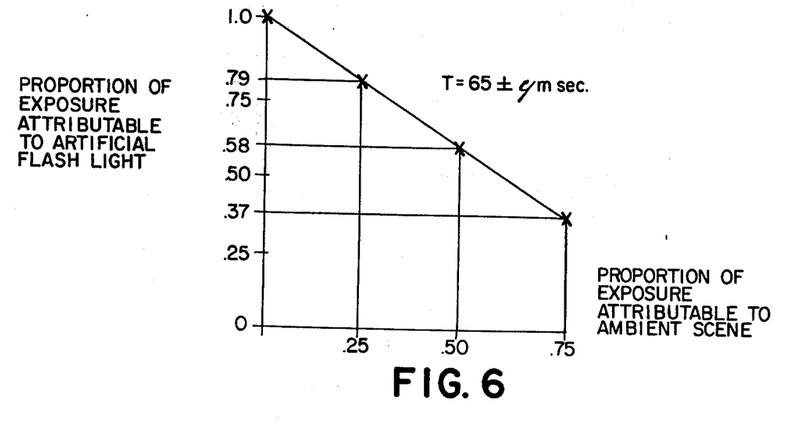
FIG. 6 is a graphical representation of the variation in the proportion of the exposure attributable to the artificial flashlight versus the proportion of exposure attributable to natural ambient scene light as the natural ambient scene light decreases.

Under conditions of low ambient scene light intensity, the light integrator circuit 72 will not provide a 0.75 volt output response prior to the expiration of the 65±4 millisecond flash time delay. Instead, the 0 volt signal level at line 90 will be transmitted by the flash delay circuit 92 at the expiration of the 65±4 millisecond time delay and inverted by the inverter 97 to provide an assertive (binary logic level 1) output signal to the OR gate 98 so as to switch the OR gate 98 and provide the flash fire signal in the aforementioned manner. Thus, the electronic flash 60 is fired at time C to provide some contribution to the film exposure which varies in accordance with the graph of FIG. 6 wherein the proportion of the select film exposure value attributable to artificial flash light is plotted as a function of the proportion of the select film exposure value attributable to ambient scene light. Thus, it can be seen that if the flash fire level detector 88 is triggered at the instant that the flash time delay circuit 92 provides an assertive output signal, the ambient scene light contribution to the select film exposure value will be 75% while the artificial flash light contribution to the select film exposure value will be 37%. As the ambient scene light decreases, the proportion of the select film exposure value attributable to ambient scene light will decrease correspondingly, and the proportion of the select film exposure value attributable to artificial scene light will increase proportionately in accordance with the graph of FIG. 6.

Figure 7:
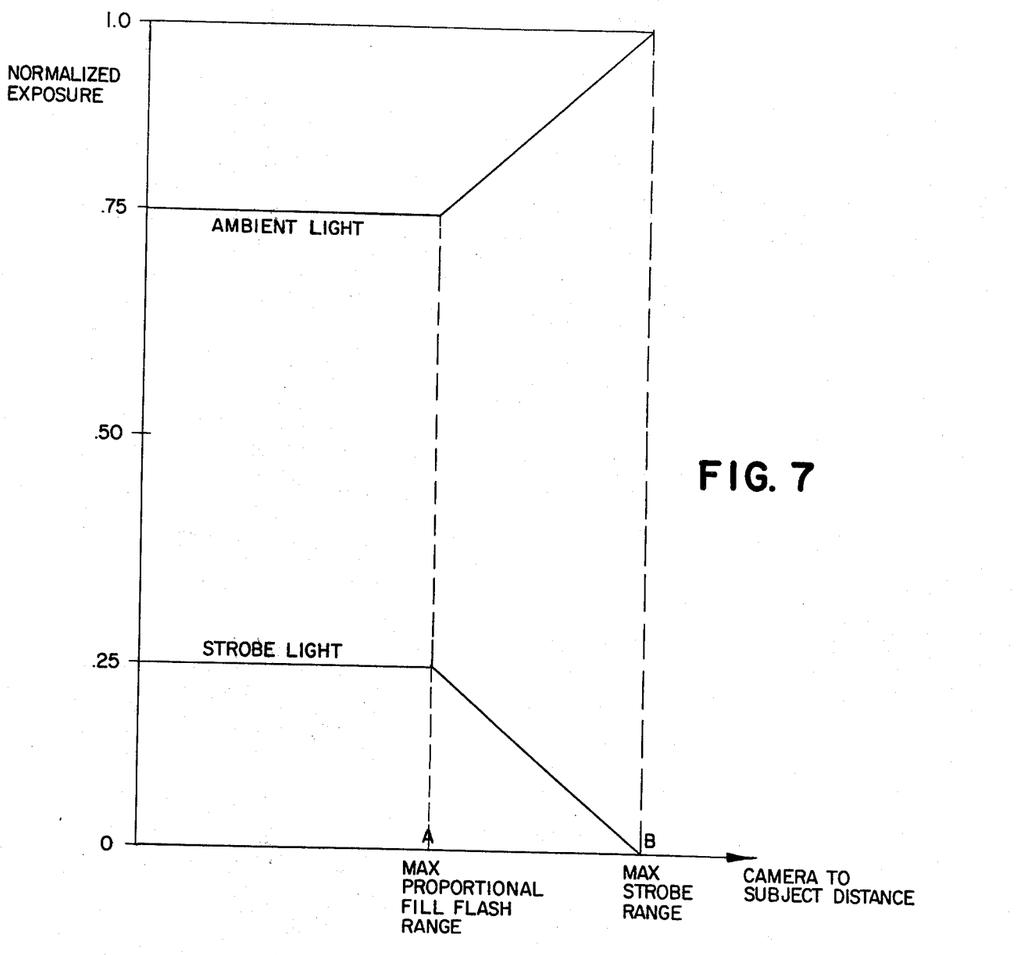
FIG. 7 is a graphical representation of the variation in the proportion of the exposure attributable to the artificial flashlight and the ambient light versus increasing camera-to-subject distance range.

Referring now to the graph of FIG. 7, there are shown the variations in the proportions of ambient and flash light which contribute to the select film exposure value plotted as a function of changes in the camera-to-subject distance. As is readily apparent, the electronic flash can only provide a 25% contribution to the select film exposure value for a limited range of camera-to-subject distances, after which the proportion of the select film exposure value contributed by the artificial light from the flash decreases and the proportion contributed by the ambient light increases until reaching a camera-to-subject distance B wherein the select film exposure value is provided solely by the available ambient scene light. A transitional zone from the maximum proportional fill flash range of the flash 60 as shown at A in the graph of FIG. 7 where the camera-to-subject distance is sufficiently great that the electronic flash 60 can no longer provide 25% of the select film exposure value, to the maximum range of the flash 60 as shown at B where the electronic flash 60 can no longer provide any contribution to the select film exposure value is automatically provided by the level detector 86 which senses both ambient scene light and artificial flash light to terminate the exposure interval. As should be readily apparent, the electronic flash 60 operates at its maximum light output capability for camera-to-subject distances greater than A and thus does not receive a quench signal.

In the event that there is neither sufficient available ambient scene light and/or artificial flash light for the output signal from the light integrator to reach 1 volt, the shutter time out circuit 94 will operate to provide an assertive output signal which is inverted by the inverter 95 to provide an assertive (binary logic level 1) signal to the OR gate 96, thereby energizing the solenoid 46 and limiting the maximum exposure interval to 100 milliseconds.

In this manner, the camera apparatus of this invention is provided with an electronic flash together with means for controlling the energization of the electronic flash to assure that a predetermined proportion of a select film exposure value will be attributable to the artificial light provided by the electronic flash at least within the effective camera-to-subject distance range of the flash. In addition, for subjects located beyond the effective range of the electronic flash, there is provided a transitional zone (FIG. 7) wherein the proportion of the select exposure value attributable to the artificial flash light gradually decreases in correspondence with an increase in the proportion of the select exposure value attributable to the available ambient scene light. In addition, as available ambient scene light decreases, there is also provided another transitional zone (FIG. 6) where the proportion of the select exposure value attributable to artificial flash light progressively increases in direct correspondence with the progressive decrease in that proportion of the select exposure value attributable to the available ambient scene light.

Other embodiments of the invention, including additions, subtractions, deletions and other modifications of the preferred disclosed embodiments of the invention will be obvious to those skilled in the art and are within the scope of the following claims.

What is claimed is:

1. A photographic apparatus of the type having means for defining a film plane and an optical path for transmitting light from a scene along the optical path to expose photosensitive film located in the film plane together with a system for controlling the firing of an electronic flash of the quench type under conditions of either substantial or negligible ambient scene light intensity, said apparatus comprising:

a blade mechanism;

means for mounting said blade mechanism for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to said optical path so as to allow the passage of scene light to the film plane;

actuatable drive means for displacing said blade mechanism between its said blocking and unblocking arrangements to define an exposure interval;

means for detecting and integrating scene light in correspondence with the scene light admitted to the film plane by said blade mechanism during an exposure interval;

means responsive to the detection and integration of ambient scene light during the exposure interval to one signal level corresponding to a select proportion of a determined exposure value for providing a flash fire signal to fire the electronic flash; and means responsive to the detection and integration of both ambient and artificial scene light to a given signal level greater than said one signal level for actuating said drive means to displace said blade mechanism from its said unblocking arrangement to its said blocking arrangement so as to terminate said exposure interval and to the detection and integration of both ambient and artificial scene light to a signal level greater than said given level for quenching the artificial light from said electronic flash so that the artificial light from said flash contributes substantially the remaining proportion of said determined exposure value.

2. The photographic camera of claim 1 including means for providing said flash fire signal at the expiration of a predetermined time delay subsequent to the commencement of said exposure interval so as to fire the flash in the event that there is insufficient ambient light for said scene light detecting and integrating means to provide said one signal level prior to the expiration of said predetermined time delay.

3. The photographic camera of claim 2 wherein said scene light detecting and integrating means leads in the detection of scene light corresponding to the scene light transmitted along the optical path to the film plane in order to anticipate for the additional scene light admitted along the optical path to the film plane during the finite time required for said blade mechanism to be moved from its said unblocking arrangement to its said blocking arrangement subsequent to the actuation of said drive means in response to the detection and integration of ambient and artificial scene light to said given signal level.

4. The photographic camera of claim 3 wherein the factor by which said scene light detecting and integrating means leads in the detection of scene light remains substantially constant during the movement of said blade mechanism from its said blocking arrangement to its largest aperture defining arrangement in its said unblocking arrangement to provide a first select proportion between ambient and artificial scene light contributing to said determinate exposure value and wherein said factor by which said scene light detecting and integrating means leads in the detection of scene light changes to another substantially constant value during a predetermined movement of said blade mechanism at its said largest aperture defining unblocking arrangement to provide a second select proportion between ambient and artificial scene light contributing to said determinate exposure value.

5. The photographic camera of claim 4 wherein said lead factor between scene light detection and scene light transmitted to the film plane disappears with continued movement of said blade mechanism through its said largest aperture defining arrangement.

6. The photographic camera of claim 4 wherein: said blade mechanism comprises two shutter blade elements each having a primary aperture level therethrough which overlap during movement of said shutter blade elements to admit scene light to the film plane, and wherein said scene light detecting and integrating means comprises secondary apertures through respective ones of said shutter blade elements, said secondary apertures being structured to overlap each other in leading relation with respect to said overlapping primary apertures during shutter blade movement from said blocking arrangement to said unblocking arrangement.

7. A method for exposing photographic film utilizing a select proportion of ambient scene light and artificial scene light provided by an electronic flash of the quench type, said method comprising the steps of:

allowing the transmission of ambient scene light along an optical axis to expose photographic film;

detecting and integrating ambient scene light in correspondence with the ambient scene light admitted along the optical axis to the photographic film;

providing a flash fire signal to fire the electronic flash in response to the detection and integration of ambient scene light to one signal level corresponding to a select proportion of a determined exposure value; and terminating the transmission of scene light to the film plane in response to the detection and integration of both ambient and artificial scene light to a given signal level greater than said one signal level and quenching the artificial light from the electronic flash so that the artificial light from the flash substantially contributes the remaining proportion of the determined exposure value in response to the detection and integration of both ambient and artificial scene light to a signal level greater than said given signal level.

8. The method of claim 7 comprising the additional step of providing the flash fire signal at the expiration of a predetermined time delay subsequent to the initial transmission of ambient scene light to the photographic film so as to fire the flash in the event that there is insufficient ambient light for the detection and integration to said given signal level prior to the expiration of said predetermined time delay.

9. The method of claim 8 wherein the detection and integration of scene light leads the scene light actually admitted to the film plane in order to anticipate for the additional scene light admitted to the photographic film during the finite time required to terminate the transmission of scene light to the film.

* * * * *